(12) United States Patent
Danielsen et al.

(10) Patent No.: US 11,959,456 B2
(45) Date of Patent: Apr. 16, 2024

(54) DEVICES AND METHODS FOR VIBRATION MITIGATION ON WIND TURBINES

(71) Applicant: General Electric Renovables Espana, S.L., Barcelona (ES)

(72) Inventors: Darren John Danielsen, Greenville, SC (US); Marc Canal Vila, Barcelona (ES)

(73) Assignee: General Electric Renovables Espana, S.L., Barcelona (ES)

(*) Notice: Subject to any disclaimer, the term of this patent is extended or adjusted under 35 U.S.C. 154(b) by 2 days.

(21) Appl. No.: 17/959,429

(22) Filed: Oct. 4, 2022

(65) Prior Publication Data
US 2023/0106043 A1    Apr. 6, 2023

(30) Foreign Application Priority Data
Oct. 4, 2021   (EP) .................................. 21382891

(51) Int. Cl.
*F03D 13/30* (2016.01)
*F03D 80/50* (2016.01)

(52) U.S. Cl.
CPC ............ *F03D 13/30* (2016.05); *F03D 80/50* (2016.05); *F05B 2260/31* (2020.08); *F05B 2260/96* (2013.01)

(58) Field of Classification Search
CPC ........ F03D 80/50; F03D 13/30; F03D 7/0296; F03D 7/0268; F05B 2260/96; F05B 2260/31
See application file for complete search history.

(56) References Cited

U.S. PATENT DOCUMENTS 6,752,595 B2 *   6/2004   Murakami ............ F03D 1/0675
                                                  416/88
7,581,926 B1 *   9/2009   Dehlsen ................ F03D 7/0236
                                                  416/37
(Continued)

FOREIGN PATENT DOCUMENTS

CA        3092485 A1      3/2021
DK         179394 B1 *    6/2011   ............ F03D 13/10
(Continued)

OTHER PUBLICATIONS

European Search Report Corresponding to EP21382891 dated Mar. 16, 2022.
(Continued)

*Primary Examiner* — Topaz L. Elliott
*Assistant Examiner* — Ryan C Clark
(74) *Attorney, Agent, or Firm* — Dority & Manning, P.A.

(57) ABSTRACT

A vibration mitigating device for engagement with a wind turbine blade includes an air flow modifying element that is configurable between a retracted configuration and an extended configuration. A frame is attachable to and has a fixed length in a span-wise direction of the wind turbine blade. The air flow modifying element is movable along the frame between the retracted configuration and the extended configuration. In the retracted configuration, the modifying element extends between the blade tip and the blade root with a first spanwise length, and in the extended configuration the modifying element extends between the blade tip and the blade root with a second, greater spanwise length.

16 Claims, 5 Drawing Sheets

(56) References Cited

U.S. PATENT DOCUMENTS

| | | | |
|---|---|---|---|
| 7,582,977 B1* | 9/2009 | Dehlsen | F03B 17/061 |
| | | | 290/1 R |
| 7,632,070 B2* | 12/2009 | Dawson | F03D 7/0236 |
| | | | 415/4.1 |
| 9,316,202 B2 | 4/2016 | Bech | |
| 10,288,039 B2 | 5/2019 | Chen et al. | |
| 10,337,540 B2 | 7/2019 | Wardropper et al. | |
| 2003/0075929 A1* | 4/2003 | Weitkamp | F03D 7/0268 |
| | | | 290/55 |
| 2010/0158687 A1* | 6/2010 | Dawson | F03D 7/0296 |
| | | | 416/89 |
| 2012/0301293 A1* | 11/2012 | Bech | F03D 13/10 |
| | | | 416/1 |
| 2015/0219070 A1 | 8/2015 | Gil Molla | |
| 2017/0002797 A1* | 1/2017 | Chen | F03D 7/0296 |
| 2017/0370386 A1* | 12/2017 | Wardropper | F03D 80/00 |
| 2018/0171975 A1 | 6/2018 | Rohm | |
| 2020/0116128 A1 | 4/2020 | Pedersen et al. | |
| 2021/0079896 A1* | 3/2021 | Herrig | F03D 3/04 |

FOREIGN PATENT DOCUMENTS

| | | |
|---|---|---|
| DK | 179394 B1 | 5/2018 |
| EP | 2565440 A2 | 3/2013 |
| EP | 3112667 A1 | 1/2017 |
| EP | 3795824 A1 | 3/2021 |
| GB | 2475865 A | 6/2011 |
| WO | WO2011067304 A1 | 6/2011 |
| WO | WO2016107624 A1 | 7/2016 |
| WO | WO2019015731 A1 | 1/2019 |

OTHER PUBLICATIONS

Lee, Airfoil Vortex Induced Vibration Suppression Devices, Thesis B.S. Naval Architecture and Marine Engineering, Massachusetts Institute of Technology Department of Mechanical Engineering, May 2007, 84 Pages. https://dspace.mit.edu/handle/1721.1/39874.

* cited by examiner

DEVICES AND METHODS FOR VIBRATION MITIGATION ON WIND TURBINES

The present disclosure relates to devices for reducing vibrations in wind turbines and to methods for using the devices and mitigating wind turbine vibrations. More particularly, the present disclosure relates to devices for reducing vortex induced vibrations and stall induced vibrations when the wind turbine is parked, especially during wind turbine installation and/or maintenance, and to ways in which the devices can be used, e.g. for installing them on wind turbine blades or once they are already installed thereon.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

There is a trend to make wind turbine blades increasingly longer to capture more wind and convert the energy of the wind into electricity. That makes blades more flexible and more prone to vibrations of the blades. Wind turbine blades vibrating excessively may get damaged. Vibrations of the rotor blades may also result in the whole wind turbine structure oscillating e.g. fore-aft oscillations, or sideways oscillations. Vibrations in the wind turbine blade may also damage other components of the wind turbine due to excessive stress.

When the wind turbine is in operation (i.e. producing energy and connected to an electrical grid), a wind turbine controller may operate auxiliary drive systems such as a pitch system or a yaw system to reduce or change loads on the blades. This way, vibrations of the blades may be counteracted. However, the problem of vibrations can be serious as well in circumstances when the wind turbine is parked and disconnected from the grid.

When a wind turbine is parked, the wind may blow against the wind turbine from unusual directions, i.e. different from when in normal operation. The airflow around the wind turbine may cause the wind turbine to vibrate. Vibrations may stress and even damage one or more wind turbine components, which may compromise the performance of the wind turbine, increase the need of repairs and reduce the lifespan of the wind turbine. As an orientation of a wind turbine blade cannot be adapted to the direction of the incoming wind, e.g. through yawing and/or pitching as opposed to when the wind turbine is operating, the effects of vibrations may be greater or different when the wind turbine is parked than when the wind turbine is operating normally and producing energy.

In particular, this may apply when the wind turbine is being installed or commissioned. For example, it may happen that an incomplete rotor is installed (e.g. a rotor having a single blade or two blades out of the total of three blades). The remaining blades may not be installed until a few days or a week later. In the meantime, the partially installed (or "incomplete") rotor may be in standstill. The rotor may or may not be locked, and the wind turbine can be exposed to varying wind conditions. This may likewise apply if the wind turbine is stopped during several hours, days or weeks, e.g. for maintenance reasons. A wind turbine blade can start to vibrate in any of these conditions depending particularly on the direction of the wind.

Different types of devices for mitigating wind turbine vibrations can be provided. These devices may be secured to a wind turbine blade for modifying the air flow around the wind turbine blade. The devices may be relatively large, both in length and in cross-section. For example, a device for vibration mitigation may have a length over 10 m. Therefore, great care has to be taken when installing them on a wind turbine blade. A risk of hitting the blade and damaging the blade and/or the device if the device hits the blade exists. Serrations on the wind turbine blade may be particularly susceptible to be damaged.

Computer simulations may help to understand and predict how a wind turbine to which one or more devices for vibration mitigation are installed may react when the wind blows and interacts with the devices. However, it may happen that the simulations are not able to fully predict how the wind turbine will react in reality. The behavior expected from simulations may be different from what it is seen in wind tunnel or field tests. Wind turbine mitigation may not be as good as expected, and in some cases, wind turbine vibration may be even increased when installing a device on a blade.

SUMMARY

In an aspect of the present disclosure, a vibration mitigating device for mitigating vibrations of a parked wind turbine is provided. The vibration mitigating device is configured to be arranged with a wind turbine blade. The vibration mitigating device comprises one or more air flow modifying elements. At least one of the air flow modifying elements is configured to change between a retracted configuration and an extended configuration.

According to this aspect, a vibration mitigating device comprises one or more air flow modifying elements. One or more air flow modifying elements, including all the air flow modifying elements of the device, may be retractable and/or extendable.

Retractable and/or extendable air flow modifying elements of a vibration mitigating device may help to adapt an amount of a surface of an air flow modifying element which is exposed to the wind. Therefore, control of the device when carrying it to a blade of a parked wind turbine may be enhanced. It may be particularly beneficial to carry the device in a retracted configuration for reducing a risk of damage to the device as well as to wind turbine, e.g. a wind turbine tower or a wind turbine blade. Control of the device once installed on the blade may also be enhanced. If more vibration mitigation is required, one or more air flow modifying elements of the device may be further extended if they are not yet fully extended. If the device and/or the wind turbine is subjected to unexpected or undesired loads or vibrations, one or more air flow modifying elements may be retracted for attenuating the undesired vibrations and/or stresses. Removing a vibration mitigating device from the blade may be avoided. This may increase the efficiency in reacting to potential dangerous or unwanted conditions. This may further facilitate activating the device, i.e. extending the air flow modifying elements of the device, once the risky or undesired events have ended.

Throughout this disclosure, an air flow modifying element may be understood as an element configured to significantly disturb an air flow, e.g. its magnitude and/or its direction, around a wind turbine blade. In some examples, an air flow modifying element may be configured to make the air flow more turbulent. In these or other examples, an air flow modifying element may alternatively or additionally be configured to increase drag in oscillation. An air flow modifying element may be flexible for allowing the device to be extendable and retractable. In some examples, a thickness of the air flow modifying element may be negligible or very small in comparison to its length and its width.

Throughout this disclosure, a retracted configuration of an air flow modifying element may mean that the air flow modifying element has a configuration in which one or more of its dimensions, i.e. length, width and/or thickness, are smaller than in an extended configuration. In examples where the entire vibration mitigating device is retractable and extendable, a retracted configuration of a vibration mitigating device may mean that the device has a configuration in which one or more of its dimensions, i.e. length, width and/or thickness, are smaller than in an extended configuration. For example, a length of an air flow modifying element along a longitudinal direction of the air flow modifying element may be increased in an extended configuration of the air flow modifying element compared to its length in a retracted configuration. In these or other examples, a width of a of an air flow modifying element may be increased in an extended configuration of the air flow modifying element compared to a retracted configuration of the air flow modifying element. This likewise applies to a length and/or a width of a vibration mitigating device.

Throughout the present disclosure, the terms "standstill" and "parked" are used interchangeably, and may be understood as a situation in which the wind turbine is not producing electricity, and the rotor is substantially standing still. The rotor may or may not be locked in standstill. For instance, a wind turbine may be parked or in standstill during installation and/or commissioning. A wind turbine may also be parked for e.g. maintenance reasons after operating normally, i.e. producing energy, or in case of a prolonged grid loss.

Herein it may be understood that a wind turbine is in operation when its rotor is rotating at a speed high enough to produce energy and the generator of the wind turbine is producing electrical power.

In a further aspect of the disclosure, a method for using a vibration mitigating device for mitigating vibrations of a parked wind turbine is provided. The method comprises arranging a vibration mitigating device comprising one or more air flow modifying elements with a wind turbine blade, wherein at least a first air flow modifying element of the one or more air flow modifying elements is in a first configuration. The method further comprises changing the configuration of at least the first air flow modifying elements to a second configuration, wherein the first configuration is one of a retracted configuration and an extended configuration, and the second configuration is the other of a retracted configuration and an extended configuration.

Still in a further aspect of the disclosure, a vibration mitigating device for mitigating vibrations of a parked wind turbine is provided. The device is configured to be arranged at least partially around a wind turbine blade. The device comprises an air flow modifying element, the air flow modifying element being configured to be retracted and extended between two ends of the device.

DETAILED DESCRIPTION OF EXAMPLES

Figure 1:
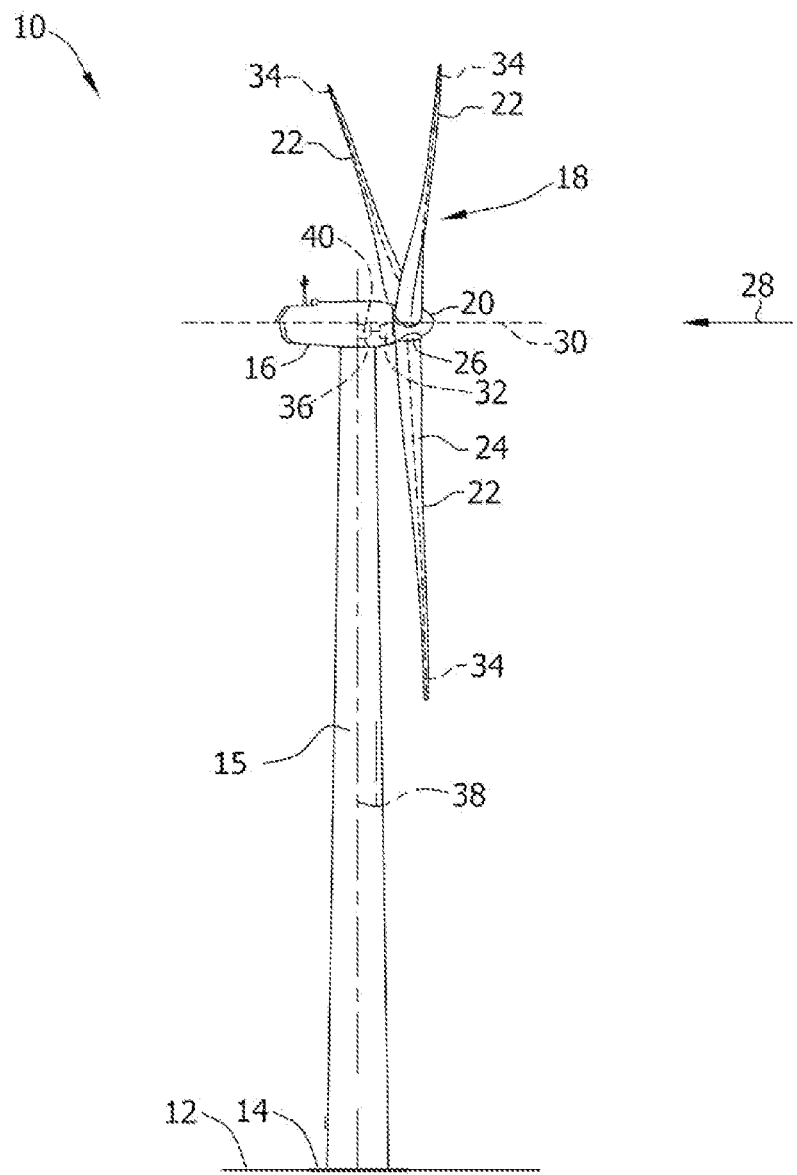
FIG. 1 illustrates a perspective view of one example of a wind turbine.

Reference now will be made in detail to embodiments of the present disclosure, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 may include a processor 40 configured to perform some of the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
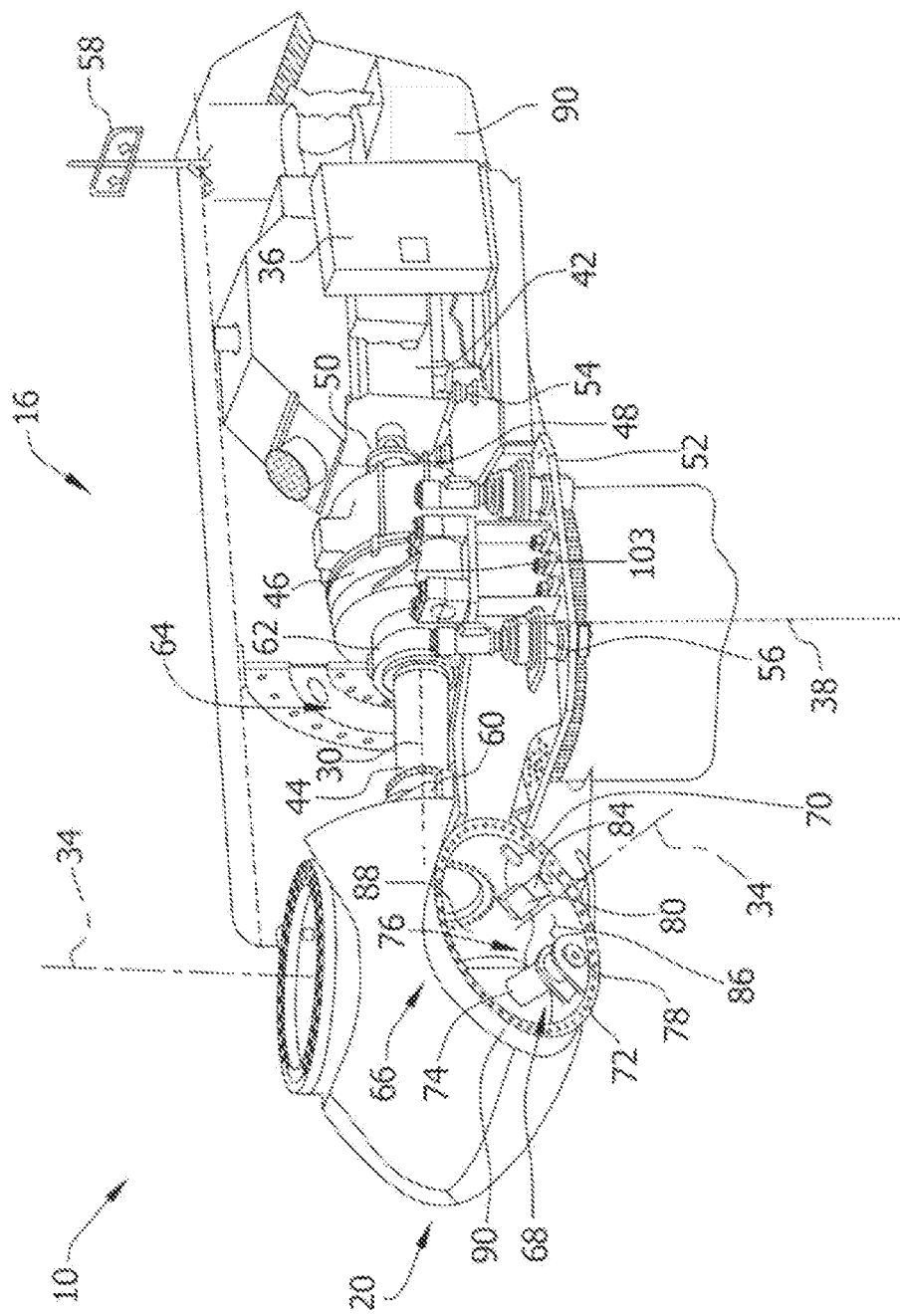
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
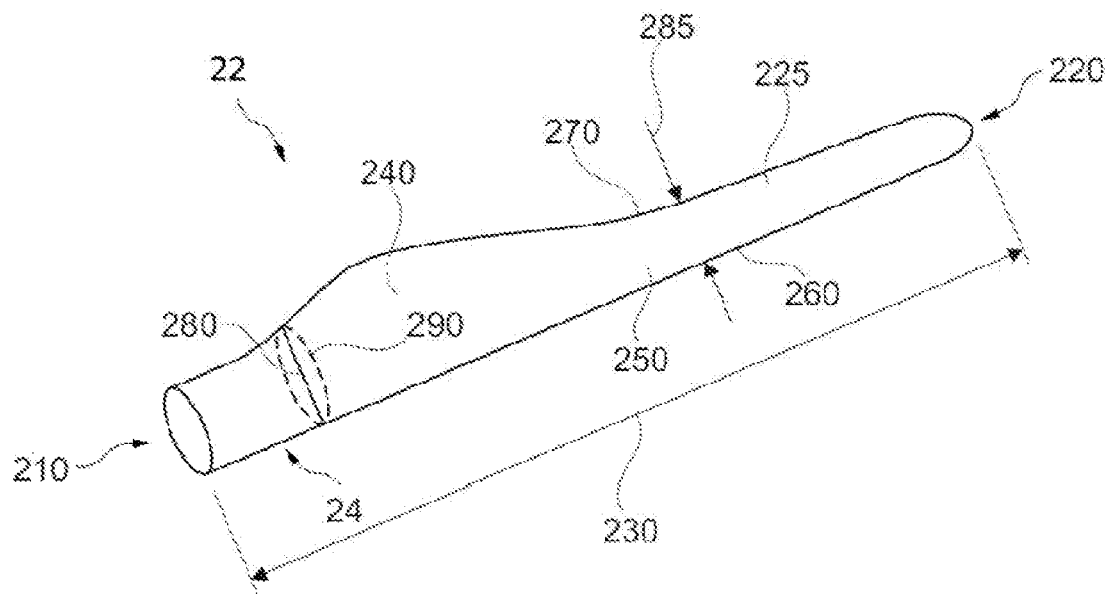
FIG. 3 illustrates a schematic perspective view of a wind turbine blade shown in FIG. 1.

A schematic perspective view of a wind turbine blade 22, e.g. one of the rotor blades 22 shown in FIG. 1, is illustrated as an example in FIG. 3. The rotor blade 22 includes a blade root 210, a blade tip 220, a leading edge 260 and a trailing edge 270. The blade root 210 is configured for mounting the rotor blade 22 to the hub of a wind turbine 10. The wind turbine blade 22 extends lengthwise between the blade root 210 and the blade tip 220. A span 230 defines a length of the rotor blade 22 between said blade root 210 and blade tip 220.

A chord 280 at a given position of the blade is an imaginary straight line joining the leading edge 260 and the trailing edge 270, the cross-section generally having airfoil shaped cross-section. As is generally understood, a chordwise direction is substantially perpendicular to a spanwise direction. Also, the chord 280 may vary in length 285 as the rotor blade 22 extends from the blade root 210 to the blade tip 220. The wind turbine blade 22 also includes a pressure side 240 and a suction side 250 extending between the leading edge 260 and the trailing edge 270. A tip region 225 may be understood as a portion of a wind turbine blade 22 that includes the tip 220. A tip region may have a length of 33%, 30%, or 25% of the span or less. A root region 24 may be understood as a portion of the blade that includes root 210. A root region may have a length of e.g. 33%, 30% of the span or less.

The rotor blade 22, at different spanwise positions, has different aerodynamic profiles and thus can have airfoil shaped cross-sections 290, such as a symmetrical or cambered airfoil-shaped cross-section. Close to a root of the blade, the cross-section of the blade may be rounded, even circular or almost circular. Closer to a tip of the blade, the cross-section of the blade may be thinner and may have an airfoil shape.

When a wind turbine is parked or stopped, vibrations caused by the air flowing around the wind turbine, in particular around the wind turbine blades, may stress and damage the wind turbine blades and the wind turbine. The wind turbine rotor may or may not be locked in these situations.

At least two types of oscillations or vibrations may happen particularly when the turbine is parked. The first ones are so-called vortex induced vibrations (VIVs), and these can arise when an angle of attack for a blade or airfoil portion is around 90 degrees. Vortex shedding may contribute to enhance the wind turbine blade oscillation. The second type of oscillations are stall induced vibrations (SIVs) which can arise when the angle of attack is close to stall angles (e.g. 15 degrees-30 degrees). The angle of attack may be understood as a geometrical angle between a flow direction of the wind and the chord of a rotor blade or a local chord of a rotor blade section.

Different devices may be attached to a wind turbine blade 22 for reducing vibrations when the wind turbine 10 is parked. The devices may comprise one or more air flow modifying elements. The performance of the wind turbine may not be negatively affected as the device(s) may be removed before the wind turbine starts normal operation. One or more devices may be particularly useful during installation and/or commissioning of a wind turbine. It may be also useful if the wind turbine is stopped, e.g. for maintenance.

A vibration mitigating device 350 for mitigating vibrations of a parked wind turbine 10 is provided. The device 350 is configured to be arranged with, e.g. at least partially around, a wind turbine blade 22. The device 350 comprises one or more air flow modifying elements 330. At least one of the air flow modifying elements 330 is configured to change between an extended configuration 375 (see e.g. FIG. 4B) and a retracted configuration 370 (see e.g. FIG. 4A).

A vibration mitigating device 350 comprising one or more retractable and/or extendable air flow modifying elements 330 may be easier to manipulate during its installation on and uninstallation from a wind turbine blade 22. Such a device 350 may also help to reduce damage to itself and/or to a wind turbine 10 when mounted to a blade 22 of the turbine 10. In both cases, an amount of wind blowing against one or more air flow modifying elements 330 may be regulated by retracting and/or extending the one or more air flow modifying elements 330. In general, retracting and extending one or more air flow modifying elements 330 may respectively reduce and increase an amount of a surface of the air flow modifying element exposed to the wind. Thus, forces exerted on one or more air flow modifying elements 330, and if the device is installed on a blade 22, also loads on a wind turbine may be better controlled.

Mounting a vibration mitigating device 350 to a wind turbine blade 22 with one or more of its air flow modifying elements 330, in particular all of its air flow modifying elements, in a retracted configuration 370 may be easier and safer than mounting a device 350 with its air flow modifying elements 330 in an extended configuration 375. For example, controlling a vibration mitigating device 350 when hoisting it to a wind turbine blade 22 of a parked wind turbine 10 may be easier if the one or more air flow modifying elements 330 are in a fully retracted configuration 370. The wind gusts may provoke less movements of the device 350 in undesired directions as one or more air flow modifying elements are retracted and therefore a surface on which the wind may act upon is decreased. Also, if the device 350 is arranged around a wind turbine blade 22 with one or more air flow modifying elements 330, in particular all of its air flow modifying elements, in a retracted configuration 370, unwanted movements during hoisting or even collisions of the device 350 with the blade 22 may be avoided or at least reduced. Serrations of the blade 22 (typically provided at a trailing edge of a blade) may be particularly susceptible to damage, and placing a vibration mitigating device 350 with its air flow modifying elements 350 in a retracted configuration 370 may help to protect the serrations as well as in general the device 350 and the blade 22. These arguments may also apply to uninstallation of the device 350 from a wind turbine blade 22.

When the vibration mitigating device 350 is already installed on a wind turbine blade 22 but some kind of undesired behavior is detected, varying a dimension of one or more air flow modifying elements 330 may facilitate transitioning to a more favorable situation. For example, if device 350 causes unexpected vibrations of the wind turbine 10 at certain wind conditions, one or more air flow modifying elements 330 may be retracted to reduce the vibrations. If wind gusts are strong enough to damage the device 350, one or more air flow modifying elements may be retracted, e.g. partially retracted, to protect it. With retractable air flow modifying elements, uninstalling the device 350 from the blade 22 may be avoided. This may allow for a faster response to a detected undesired situation, and therefore for reduced risk of damage of both the device and the wind turbine. Also, if one or more air flow modifying elements are not fully extended, the wind conditions change and more vibration mitigating is required, one or more air flow modifying elements may be further extended. Adaptability of the device 350 to the needs with respect to vibration mitigation of the wind turbine 10 may be increased.

In addition, a vibration mitigating device 350 as described herein may help to quickly see how the device and the wind turbine 10 behave during testing campaigns, e.g. in a short time window it may be known if a response of the device and the wind turbine are as expected and/or if some unwanted behavior arise. Retractable and/or extendable air flow modifying elements 330 may help to test different configurations of the device and compare the effects on wind turbine vibration relatively fast.

The air flow modifying elements 330 of the device 350 are configured to mitigate wind turbine vibrations such as vortex induced vibrations and/or stall induced vibrations. To this end, the air flow modifying elements may have a specific shape in an extended configuration, e.g. a U- or C-shape (such shapes may increase drag when oscillating), and/or the air flow modifying elements may have one or more air flow modifying features. For example, an air flow modifying element may comprise one or more of protrusions, recesses and through-holes. Other shapes of an air flow modifying element are possible.

Figure 4A:
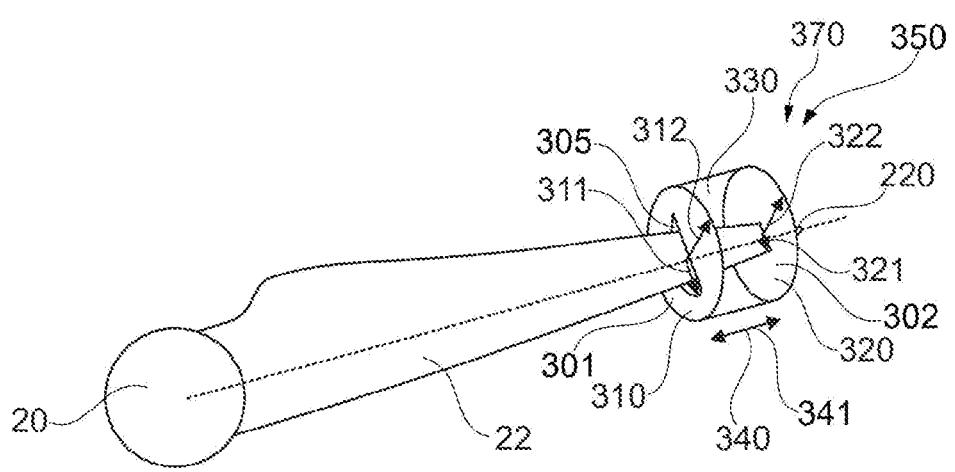
FIGS. 4A and 5A schematically illustrate a perspective view of two examples of a device for mitigating vibrations, the device being arranged around a wind turbine blade with its air flow modifying elements in a retracted configuration.
Figure 4B:
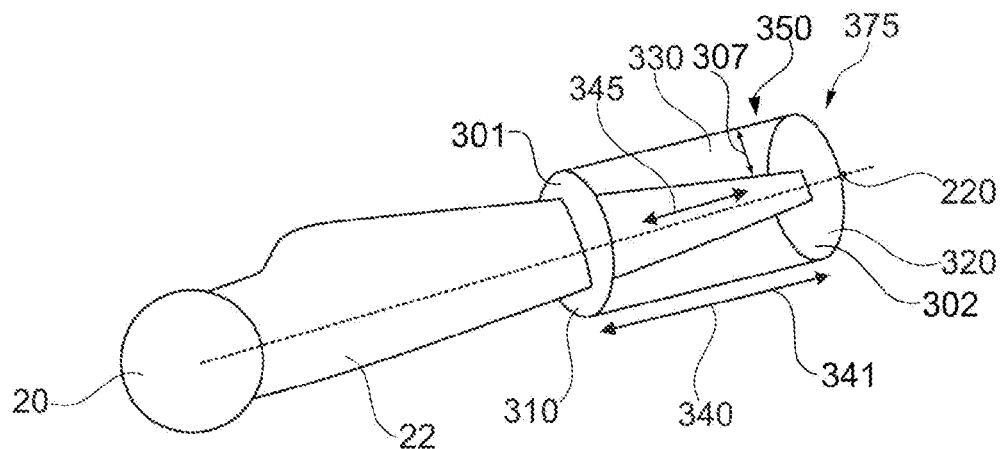
FIGS. 4B and 5B schematically illustrate a perspective view of the vibration mitigating devices of FIGS. 4A and 5A in an extended configuration.
Figure 5A:
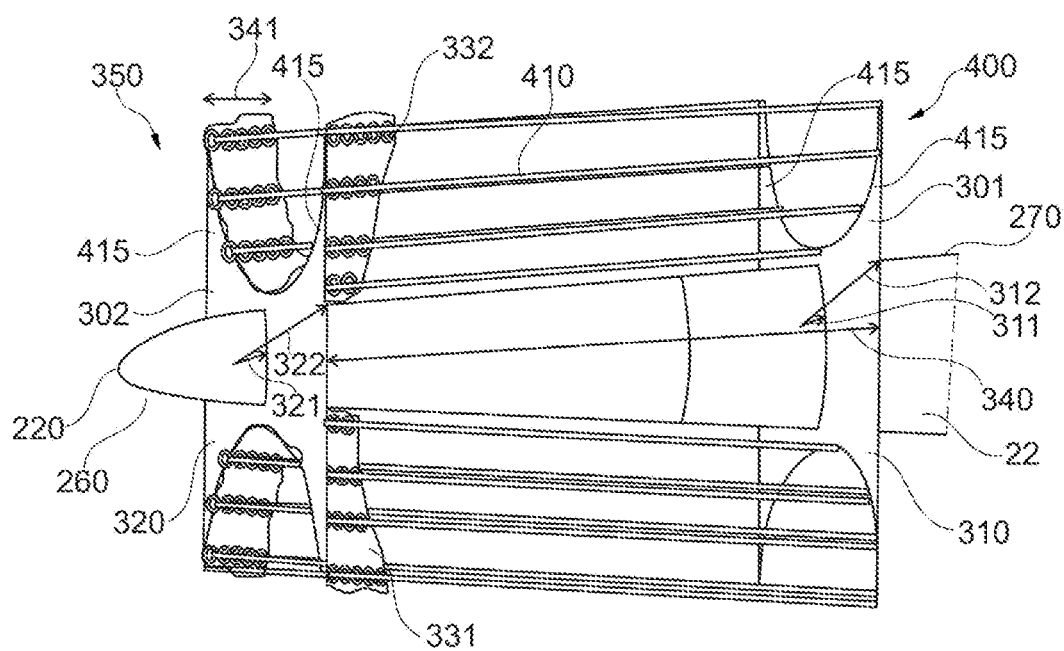
Figure 5B:
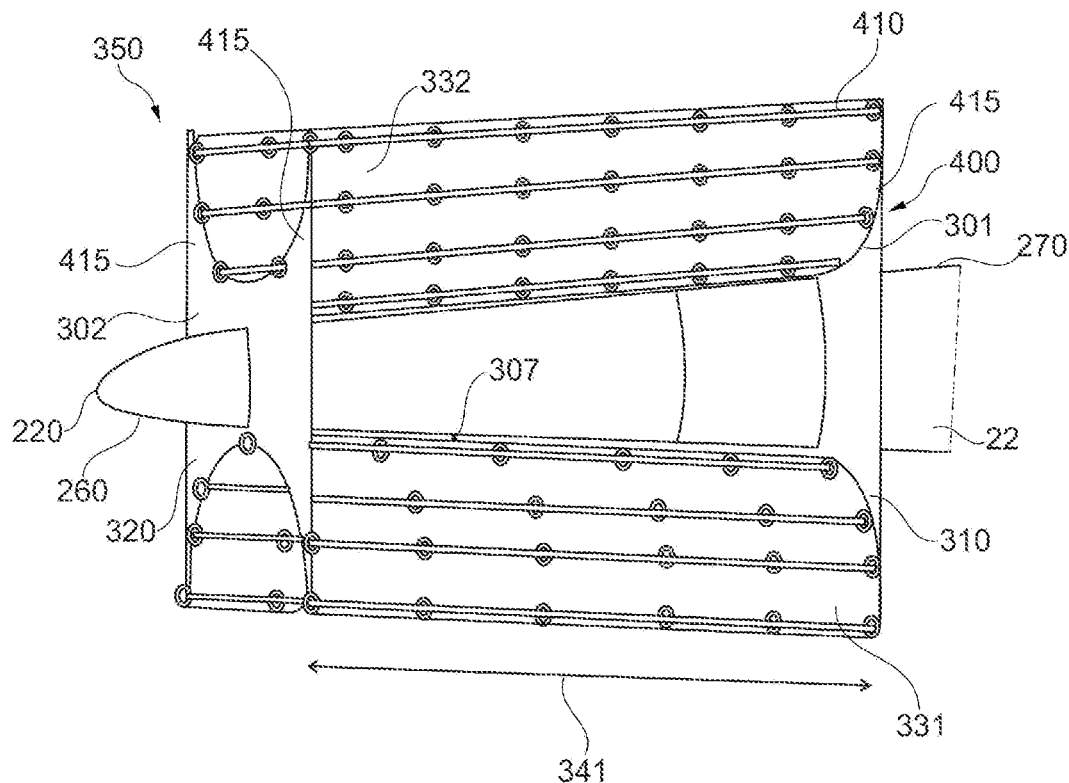

An example of a vibration mitigating device 350 including a single air flow modifying element 330 is shown in FIGS. 4A and 4B. An example of a vibration mitigating device 350 including two air flow modifying elements 330 is shown in FIGS. 5A and 5B. Other examples of vibration mitigation devices comprising one or more retractable and/or extendable air flow modifying elements are of course possible. The air flow modifying elements 330 are configured to receive more wind in an extended configuration 375 than in a retracted configuration 370.

In some examples, as e.g. in the examples of FIGS. 4A-5B, an air flow modifying element may be configured to significantly disturb an air flow before it reaches a local surface of a wind turbine blade. In some of these examples, an air flow, or a component of the air flow, moving towards a local blade surface in a direction substantially perpendicular to a length of the blade may encounter the air flow modifying element. In some other examples, an air flow modifying element may be configured to significantly disturb a spanwise component of an air flow without destroying it. Thus, a spanwise component may keep existing after an alteration of the air flow.

In some examples, an air flow modifying element may be a textile-based air flow modifying element, e.g. a tarp, a weave, a cloth or a net. An air flow modifying element may in some examples have four edges. When fully extended on a flat surface, e.g. on the ground, an air flow modifying elements may have a rectangular or trapezoid shape.

In the example of FIGS. 4A and 4B, the vibration mitigating device 350 is extendable and retractable. The air flow modifying element 330, and in this example also the device 350, have a retracted configuration 370 and an extended configuration 375. In this example, a length 341 of the air flow modifying element is larger in the extended configuration 375 than in the retracted configuration 370. In FIG. 4B, the air flow modifying element 330 and also the vibration mitigating device 350 is fully extended. In this example, the air flow modifying element 330 extends between a first end 320 and a second end 310 of the vibration mitigating device 350, in particular between a tip end 320 and a root end 310. A root end may be understood as an end of the device configured to be closer to a blade root 210 than a tip end 320 when mounted to, e.g. around, the blade. A tip end may be understood as an end of the device configured to be closer to a blade tip 220 than the root end 310 when arranged with, e.g. around, the blade 22. A distance or separation between a first end and a second end of the device may be increased and decreased for extending and retracting the device.

In the example of FIGS. 5A and 5B, only the air flow modifying elements 330 are retractable and extendable. I.e., only a length 341 of the air flow modifying element is variable while a length of the device is fixed in this example. A distance between a first end and a second end of the device 350 is not variable, as it is in the example of FIGS. 4A and 4B. A vibration mitigating device 350 may comprise a frame 400 configured to support one or more air flow modifying elements 330 and the one or more air flow modifying element 330 may be configured to move along the frame 400. I.e., a frame 400 may be configured to support and allow the movement of one or more air flow modifying elements 330 at least along a portion of the frame.

A frame 400 may comprise two supports, e.g. a tip support 302 and a root support 301, and one or more rails 410 extending between the two supports. It may be understood that a tip support 302 is configured to be closer to a tip 220 of the blade 22 than a root support 301 when the device 350 is mounted at least partially around the blade 22. Likewise, it may be understood that a root support 301 is configured to be closer to a root 210 of the blade 22 than a tip support 302 when the device 350 is mounted at least partially around the blade 22. The two air flow modifying elements 330 of the vibration mitigating device 350 of this example are shown in a retracted configuration 370 in FIG. 5A and in an extended configuration 375 in FIG. 5B. The two air flow modifying elements are fully retracted in FIG. 5A and fully extended in FIG. 5B.

In some examples, one or more air flow modifying elements 330 may be configured to extend and/or retract towards at least one of a blade root 210 and a blade tip 220. In the example of FIGS. 4A and 4B, both the air flow modifying element 330 and the device 350 are retractable and extendable along a longitudinal direction of the blade 22. The air flow modifying element and the vibration mitigating device can for example be extended towards a blade root 210 and retracted towards a blade tip 220. In the example of FIGS. 5A and 5B, a leading edge air flow modifying element 330a is retractable and extendable along a direction substantially parallel to the leading edge 230. A trailing edge air flow modifying element 330b is retractable and extendable along a direction substantially parallel to the trailing edge. In other examples, a leading edge air flow modifying element 330a may extend along a leading edge 260, but not necessarily parallel to it. This is also applicable to a trailing edge air flow modifying element 330b.

In other examples, one or more air flow modifying element 330 may be configured to extend and retract at least partially around a cross-section of a wind turbine blade 22. A cross-section may be understood as a plane substantially perpendicular to a spanwise direction of the blade. A device 350 may comprise air flow modifying elements 330 which are configured to extend and retract in different directions. For example, one air flow modifying element may be configured to extend and retract along a longitudinal direction of a blade 22 and another air flow modifying element may be configured to extend and retract along a blade 22 in cross-section, e.g. radially around the blade 22. In general, extension and retraction may be along any suitable direction.

In some examples, the vibration mitigating device 350 may comprise an inside channel 305 extending from a root end 310 to a tip end 320 of the device. The channel may e.g. extend along a length 340 of the vibration mitigating device. The channel may be seen as a through hole in some examples and may be referred to as air channel. In the example of FIGS. 4A and 4B, the air channel is delimited by the tip end 320, the root end 310 and the air flow modifying element 330 of the device 350.

The device 350 may be oriented such that the inside channel 305 of the device surrounds the tip 220 of the blade 22. The device may be moved towards a blade root 210 from that position such that the air channel 305 receives the blade 22. In FIGS. 4A and 4B, the air channel 305 of the device 350 surrounds a tip region 225 of the wind turbine blade 22.

In other examples, a vibration mitigating device 350 may lack such an air channel 305.

In some examples, the vibration mitigating device 350 may be configured to provide a gap 307 between one or more air flow modifying elements 330 and a surface of the wind turbine blade 22 when the device is mounted to the blade 22. In the examples of FIGS. 4A-5B, the device is configured to keep its air flow modifying elements separated from a blade surface. I.e., a gap 307 is provided between the totality of an air flow modifying element and a corresponding blade surface below the air flow modifying element. This may facilitate extending and retracting the air flow modifying element as well as increasing drag.

In some examples, a first end 320 and a second end 310 of the device 350 are configured to separate the one or more air flow modifying elements 330 from a local blade surface. In some examples, a first end 320 of the vibration mitigating device, e.g. a tip end, may comprise a first support 302, e.g. a tip support; and a second end 310 of the device, e.g. a root end, may comprise a second support 302, e.g. a root support. A first support 302 and a second support 301 of the vibration mitigating device 350 may be stiff enough for keeping the air flow modifying element(s) separated from a blade surface. I.e., the supports 301, 302 may be rigid enough such that, when the device is in use, they are able to keep a substantially same or similar shape as when mounted to, e.g. around, a blade 22. As the first support 302 and the second support 301 may not undergo substantially any or significant deformation due to wind gusts, a gap 307 between the air flow modifying elements of the device and a local blade surface may be kept when the device is in use, e.g. in a fully extended configuration.

A shape and size of the first support 302 and the second support 301 may be adapted for obtaining a desired separation between an air flow modifying element 330 and a local blade surface when the device is mounted to a wind turbine blade 22. In some examples, each support may have, in cross-section, an internal radius 311, 321 and an external radius 312, 322. For example, an internal radius 321 of the tip support 302 may be smaller than an internal radius 311 of the root support 301. For example, in the devices of FIGS. 4A-5B, an internal radius 321 of the tip support 302 is smaller than an internal radius 311 of the root support 301. I.e., the tip support 302 has, in cross-section, an internal perimeter shorter than an internal perimeter of the root support 301. A radius of the root support 301 and of the tip support 302 may be measured in a same direction. An internal edge 311, 321 (or internal surface if not in cross-section) may be configured to follow a local profile of a blade in cross-section in some examples. In some other examples, an internal edge may have a substantially circular or elliptic shape. For example, the vibration mitigating device of FIGS. 4A-5B may have a tip support 302 and a root support 301 configured to follow a profile of a cross-section of a wind turbine blade.

The root support 301 and/or the tip support 302 may have a doughnut-like shape in some examples. The tip and root supports' may be hollow in some of these examples. In other examples, the root 301 and/or the tip 302 supports may comprise an internal ring and an external ring connected, e.g. radially connected, to one another. In some examples, the root 301 and tip 302 supports may be inflatable.

In some examples, a first 302 and/or a second 301 support, e.g. a tip and/or a root support, may comprise one or more protrusions 415 extending outwardly. The protrusions 415 may be configured to extend away from a local wind turbine blade surface when the device 350 is mounted to the blade 22. An external edge of the support comprising two protrusions may form a C- or U-shape in cross-section. A portion of a support comprising two protrusions may therefore have a concave edge. In the example of FIGS. 5A and 5B, the tip support 302 comprises four protrusions 415. Likewise, the root support 301 comprises four protrusions 415.

A support 301, 302 may comprise a leading edge portion and a trailing edge portion. The leading edge portion may be configured to surround the leading edge 260. The trailing edge portion may be configured to surround the trailing edge 270. Each portion may comprise two or more protrusions. In the example of FIGS. 5A and 5B, the leading edge portion of a support 301, 302 comprises two protrusions forming an exterior concave edge. Likewise, the trailing edge portion of a support 301, 302 comprises two protrusions forming an exterior concave edge.

The tip support 302 and the root support 301, may be comprised in a frame 400. A frame 400 may be configured to support and allow the movement of one or more air flow modifying elements 330 at least along a portion of the frame. The frame 400 may include one or more rails 410 along which one or more air flow modifying elements 330 can move. A frame may comprise a first support, a second support and or more rails 410 extending between the first and the second support. For example, the rails 410 may extend between a tip support 302 and a root support 301. The one or more rails may be attached to a concave exterior edge of a support in some examples.

In the example of FIGS. 5A and 5B, seven rails extend between the concave exterior edge of the leading edge region of the tip support 302 and the concave exterior edge of the leading edge region of the root support 301. Likewise, seven rails extend between the concave exterior edge of the trailing edge region of the tip support 302 and the concave exterior edge of the trailing edge region of the root support 301. It should be clear that in other examples a different number of rails may be used. When the frame is attached to a wind turbine blade 22, the rails connected to the leading edge regions of the supports 301, 302 extend along the leading edge 260 of the blade 22, e.g. substantially parallel to the leading edge 260. Likewise, the rails 410 connected to the trailing edge regions of the supports 301, 302 extend along the trailing edge 270 of the blade 22, e.g. substantially parallel to the trailing edge 270. The plurality of rails may be substantially straight. Therefore, when an air flow modifying element 330 is extended, as e.g. in FIG. 5B, it has a C- or U-shape cross-section. This shape may be particularly suitable for increasing drag and may therefore contribute to reduce edgewise oscillations caused by ViVs and/or SiVs.

As the device 350 may be configured to provide a gap 307 between an air flow modifying element 330 and a local surface of a blade 22 when the device is installed on it, a rail configured to be the closest to a wind turbine local surface may be separated from a local blade surface. Accordingly, an air flow modifying element 330 configured to move along the rails 410 may also be separated from the wind turbine blade 22.

Although in the examples of FIGS. 5A and 5B a frame 40 comprises a tip support 302, a root support 301 and a plurality of rails extending between the tip 302 and root 301 supports, a frame may have rails extending in other directions different from a blade tip-blade root direction. For instance, one or more rails 410 may extend along a chordwise direction. In some examples, one or more rails 410 may be curved. For instance, a plurality of rails may be configured to follow a profile in cross-section of a wind turbine blade.

An air flow modifying element 330 may be movably attached to one or more rails 410. In some examples, an air flow modifying element may comprise a plurality of holes configured to receive a rail. For instance, an air flow modifying element may comprise two or more rows of holes, and each row of holes may be configured to be inserted in a rail. The example of FIGS. 5A and 5B schematically illustrates this. As in this example a leading edge region of the frame, i.e. a region of the frame configured to be arranged along the leading edge 260, comprises seven rails, the air flow modifying element 330 movably attached to these rails comprises seven rows of holes. This likewise applies to a trailing edge region of the frame, i.e. a region of the frame configured to be arranged along the trailing edge 270 of the blade 22. In other examples, the rails may comprise a plurality of hooks (not shown) and the air flow modifying element 330 may be configured to be hanged from the hooks. Other options for movably attaching an air flow modifying element to one or more rails 410 may be possible.

In some examples, the vibration mitigating device 350 may be configured to retract and/or extend the at least one of the air flow modifying element 330. I.e., an operator may not need to pull an air flow modifying element manually or an operator may not need to pull or release a rope for extending and retracting an air flow modifying element (although one or more operators may do so in some examples, e.g. from a lifting device such as a crane or from a hub or nacelle). In other words, extension and/or retraction may be automatic instead of manual in some examples. The air flow modifying element may be extended and retracted by using a remote control e.g. from a ground 12, a nacelle 16 or a hub 20. In some examples, a vibration mitigating device 350 may comprise an extending and/or retracting system (not shown) configured to extend and/or retract one or more air flow modifying elements 330. In some examples, for instance in the example of FIGS. 5A and 5B, a vibration mitigating device 350 may include a power supply, e.g. a motor, for extending and retracting the air flow modifying elements of the device. When the vibration mitigating device 350 is installed on a wind turbine blade 22 and it is desired to extend and/or retract one or more air flow modifying elements, a system component such as a motor may be remotely activated to move the air flow modifying element.

An extending and/or retracting system or component may be connected to an air flow modifying element in different ways. In some examples, a connector may attach an air flow modifying element, e.g. a root end 310 or a tip end 320 of an air flow modifying element, to an extending and/or retracting component. In these examples, when the extending and/or retracting component is activated, it may tighten, e.g. pull, the connector or it may loosen the connector. Tightening and loosening the connector may cause the air flow modifying element to move along the rails. A connector may e.g. be a rope, a chain, a sling or a similar elongated element. In other examples, an extending and/or retracting component may be a linear actuator. In some examples, one or more telescopic rails 410 may be used. In some examples, hydraulic, pneumatic or electrically powered actuators may be used. Other ways of extending and/or retracting an air flow modifying element may be possible. For example, one or more drones may be used to extend and/or retract one or more air flow modifying elements 330. For instance, one or more drones may be attached to the device 350, e.g. to one or more ends of an air flow modifying element or to one or more ends of the device 350, and used to extend/retract the air flow modifying elements.

In some examples, an air flow modifying element 330 may be configured to be moved from a first end to a second end of the device, e.g. from a tip end 320 to a root end 310 or from a root end 310 to a tip end 310. In other examples, an air flow modifying element 330 may be configured to be moved from a central portion of the device towards the ends of the device, e.g. from a central portion of the device towards the tip end 320 and towards the root end 310 of the device. Likewise, a first end of the air flow modifying element 330 may be configured to be moved towards a central portion of the device 350 and a second end of the air flow modifying element may be configured to be moved towards the central portion of the device.

In some examples, the vibration mitigating device 350 may have a closed cross-section. For instance, the device of FIGS. 4A and 4B has a closed cross-section. The device may be hollow, or at least partially hollow, in some examples. For instance, the device 350 of the example of FIGS. 4A and 4B is hollow and has a closed cross-section, e.g. a substantially circular or elliptical cross-section. In some examples, a vibration mitigating device 350 may have a substantially cylindrical, conical or truncated-conical shape. In the example of FIGS. 4A and 4B, the device 350 has a cylindrical shape.

In some examples, at least one air flow modifying element 330 may comprise a plurality of pores, e.g. it may be a net. An air flow modifying element may be made of a sponge-like material in other examples. A porous or permeable air flow modifying element may be understood throughout this disclosure as an air flow modifying element comprising a plurality of holes (pores) such that air can pass through them, and therefore from one side of the air flow modifying element 330 to the other side of the air flow modifying element 330. In other examples, the air flow modifying element 330 may be non-porous or non-permeable, i.e. air would not be able to go through the air flow modifying element 330, but it would have to surround it instead. The air flow modifying element 330 of FIGS. 4A and 4B may be a cloth, a weave or a net in some examples. The air flow modifying elements 330 of FIGS. 5A and 5B may be a tarp or a cloth in some examples.

A wind turbine blade 22 comprising one or more vibration mitigating devices 350 as described herein is provided. In some examples, a wind turbine blade 22 comprises one vibration mitigating device 350 arranged around a tip region 225 of the blade 22. A parked wind turbine 10 comprising a tower 15, a nacelle 16, a hub 20 and one or more blades 22, at least one of the blades 22 comprising a vibration mitigating device 350 is also provided.

Figure 6:
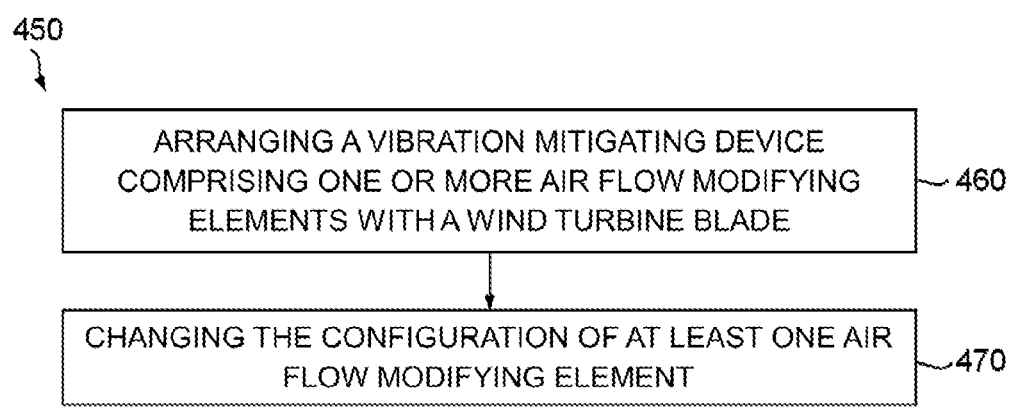
FIG. 6 illustrates a flow chart of an example of a method for using a vibration mitigating device for mitigating vibrations of a parked wind turbine.

According to another aspect of the disclosure, a method 450 for using a vibration mitigating device 350 for mitigating vibrations of a parked wind turbine 10 is provided. The method 450 is schematically illustrated in FIG. 6. The method comprises arranging 460 a vibration mitigating device 350 comprising one or more air flow modifying elements 330 with, e.g. at least partially around, a wind turbine blade 22. At least a first air flow modifying element of the one or more air flow modifying elements is in a first configuration. The method further comprises changing 470 the configuration of at least the first air flow modifying element to a second configuration. The first configuration is one of a retracted configuration 370 and an extended configuration 375, and the second configuration is the other of a retracted configuration 370 and an extended configuration 375.

A vibration mitigating device 350 including one or more air flow modifying element 330 may be a device such as the ones referred to with respect to FIGS. 4A-5B. Other vibration mitigating devices 350 comprising one or more retractable and/or extendable air flow modifying elements 330 different from the ones illustrated in these figures may be used. The air flow modifying elements 330 may be configured to extend and/or retract in any suitable direction, e.g. in a blade tip 220—blade root 310 direction or radially around the blade 22 in cross-section as well as in other directions.

In some examples, all the air flow modifying elements 330 of a vibration mitigating device 350 may be in the first configuration. In other examples, a number of air flow modifying elements 330 less than a total number of air flow modifying elements of the device 350 may be in the first configuration. Changing the configuration of at least the first air flow modifying element 330 may comprise at least one of pulling, pushing and sliding it. Other ways may be used in some examples.

In some examples, changing the configuration of at least the first air flow modifying element 330 may comprise moving at least the first air flow modifying element 330 between a first end 320 and a second end 310, e.g. between a tip end and a root end, of the vibration mitigating device 350. In these or other examples, the at least first air flow modifying element 330 may be moved along one or more rails 410. The rails may extend between two ends of the device in some examples. In other examples, the one or more rails may extend between two portions of the device, but not necessarily two ends of the device. Moving an air flow modifying element between two ends of the vibration mitigating device 350 and/or along one or more rails 410 may extend it or retract it, depending on how the device is configured. For example, depending on how the device is configured, moving an air flow modifying element, e.g. and end of an air flow modifying element, towards an end of the device may extend or retract the air flow modifying element. Extension and/or retraction of an air flow modifying element along a device 350 may be performed towards a blade tip 220 and/or a blade root 210 in some examples.

In some examples, changing the configuration of at least the first air flow modifying element 330 may comprise at least one of increasing a distance between a first end 320 and a second end 310 of the device 350, and decreasing a distance between the first end 320 and the second end 310 of the device 350, e.g. between a tip end and a root end. For example, a root end of the device 350 of FIGS. 4A and 4B may be moved towards a blade root 210 for increasing a distance between the tip end 320 and the root end 310, and therefore extending the air flow modifying element 330 and the device 350. An end of the device, e.g. a root end 310, may be moved towards a blade tip 220 for decreasing a distance between the root end and the tip end, and therefore retracting the air flow modifying element and the device. For example, an operator may release a rope from an anchoring point in the nacelle 16 such that an amount of rope between the device, e.g. a root end 310 of the device, and the operator is increased. The root end 310 may then move towards a blade end 320 of the device, and therefore decrease in length. One or more ropes or other fasteners may secure a tip end 320 of the vibration mitigating device to its position around the blade 22. One or more fasteners may avoid that a tip end 320 of a device may fall towards a blade tip 220 when a root end 310 is freed. The tip end 320 may be attached to the wind turbine blade 22, to a hub 20 or to a nacelle 16 in some examples.

In some examples, the vibration mitigating device 350 may be arranged with at least the first air flow modifying element 330 in a retracted configuration 370 and at least the first air flow modifying element is changed to an extended configuration 375. A vibration mitigating device 350 with its air flow modifying elements in a retracted configuration 370 may be easier to carry to a wind turbine blade 22 and to arrange with, e.g. at least partially around, the wind turbine blade 22 than a device 350 with its air flow modifying elements in an extended configuration 375. One or more manners as mentioned above may be used to extend a retracted air flow modifying element 330 or device 350.

For example, if one or more drones or one or more ropes are used to carry or lift a vibration mitigating device 350 towards a wind turbine blade 22 of a parked wind turbine 10 with one or more air flow modifying elements, e.g. all of its air flow modifying elements, in a retracted configuration 370, the device 350 may be oriented such that its root end 310, which may have an internal radius 311 larger than an internal radius 312 of the tip end 320, surrounds the wind turbine blade tip 220 before the tip end 320. A device such as the ones shown in FIGS. 4A-5B may be carried in this way, e.g. from a ground 12, a nacelle 16 or a hub 20. One or more carrying ropes may attached the device and the drones. A carrying rope may be attached at or near a root end 310 in some examples.

If one or more operators are to use one or more ropes, the wind turbine blade may be first positioned pointing downwards, e.g. in a six o'clock position. One or more ropes may be descended from a hub or nacelle, attached to the device 350 and used to lift it towards the blade 22.

If a vibration mitigating device such as the one in FIGS. 4A-5B is to be installed around a blade 22, one or more air flow modifying elements 330 or the device 350 may be maintained in the retracted configuration 370 by a connector. A connector may e.g. be attached to a tip end 320 and a root end 310 of the device 350 in the example of FIGS. 4A and 4B. A connector may e.g. keep an air flow modifying element 330 close to an end 310, 320 of the device 350 in the example of FIGS. 5A and 5B. A connector may be used with other types of air flow modifying elements and devices too. In other examples, a connector may be dispensed with.

In some examples, a connector may be breakable. A breakable connector may be understood as a connector attachable to two portions of the device, e.g. to a root 310 end and a tip end 320 of the device, which is configured to break when it is pulled with a force above a predetermined threshold. The breakable connector may comprise a fusible portion or a weakened portion configured to break at a specific force level. If the connector is not breakable, when the device is arranged around a wind turbine blade 22, an operator may remove the connector. The device may then be extended by the operator or in other ways.

If the connector is breakable, the intervention of an operator for changing the configuration of the device during installation may be avoided or limited. For instance, once the device 350 is arranged around a blade 22 in a retracted configuration 370, an operator handling a rope from a hub 20 or a nacelle 16, or a drone if a drone is used, may keep pulling the vibration mitigating device 350 towards the root 210. But as at least a tip end 320 of the device 350 may not able to continue moving towards the root 210, the force exerted on the device may increase due to the retaining action of the breakable connector. The pulling force may become high enough to cause the breakable connector to break. In the example of FIGS. 4A and 4B, this may free the root end 310, and the root end may be further moved towards the blade root 210, e.g. until it is completely extended. In the example of FIGS. 5A and 5B, this may free an end of an air flow modifying element 330 and the pulling may extend the air flow modifying element 330. If one or more drones are used, they may carry the ropes to a nacelle or hub where they can be attached to an anchor point by one or more operators. If the operators are pulling the device 350 or one or more air flow modifying elements 330 from a hub 20 or nacelle 16 for extending them, they may also attach the ropes to an anchoring point.

In some examples where the vibration mitigating device 350 is arranged with at least the first air flow modifying element 330 in a retracted configuration 370 and the configuration of at least the first air flow modifying element 330 is changed to an extended configuration 375, the method may further comprise determining that a condition related to the vibration mitigating device 350 and/or related to the wind turbine 10 is met. In response to the condition being fulfilled, the method may further comprise changing the configuration of at least the first air flow modifying element 330 to a retracted configuration 370.

Similarly, in some examples where the vibration mitigating device 350 is arranged with at least the first air flow modifying element 330 in an extended configuration 375, at least the first air flow modifying element may be changed to a retracted configuration 370 in response to a determination that a condition related to the vibration mitigating device 330 and/or the wind turbine 10 is met. I.e., regardless of whether a device 350 is mounted to a blade 22 in a retracted 370 or an extended 375 configuration, once the device 350 is extended, it may be retracted if deemed suitable.

A condition in some examples may comprise an increase in vibrations of and/or loads on at least one of the vibration mitigating device 350 and the wind turbine 10, in particular an increase above a predetermined threshold. For instance, a condition may in some examples be an increase in vibration of a wind turbine 10, e.g. of a wind turbine blade 22 and/or a wind turbine tower 15. An increase in vibration may be an increase in an amplitude of vibration and/or an increase in a frequency of vibration. In some examples, a condition may comprise at least one of a tensile, compressive, bending, torsional and shear loads acting on a vibration mitigating device 350 overcoming a predetermined threshold. Loads acting on a vibration mitigating device may refer to one or more of loads acting on one or more air flow modifying elements 330 of the device, loads acting on a frame 400 of the device if the device comprises a frame, and loads acting on one or more air flow modifying element supports 301, 302. In some examples, a condition may comprise at least one of a tensile, compressive, bending, torsional and shear loads acting on a wind turbine e.g. a wind turbine blade 22 or wind turbine tower 15, overcoming a predetermined threshold.

If the wind turbine experiences an undesired or unexpected behavior, such as increased vibrations or stresses, one or more air flow modifying elements 330 or the entire device 350 may be retracted. This may help to avoid or at least reduce damage to a wind turbine 10, such as to a wind turbine blade 22 and/or a wind turbine tower 15. If the vibration mitigating device 350 or a portion thereof experiences one or more loads above a predetermined threshold, which may damage the device, one or more air flow modifying elements 330 or the entire device may be retracted. This may help to avoid or at least reduce damage to the device. The above conditions may be monitored jointly or separately. For example, only a state of a wind turbine (e.g. vibrations and/or loads experienced by it) may be monitored, only a state of a vibration mitigating device may be monitored (e.g. vibrations and/or loads experienced by the device), or both a state of a wind turbine and a state of a vibration mitigating device may be monitored (e.g. vibrations and/or loads experienced by the device and by the wind turbine).

Determining may include using one or more sensors, e.g. for measuring vibration and/or loads. Determining may additionally or alternatively comprise visual inspection. One or more sensors may be provided with the device in some examples. In these or other examples, one or more sensors may be provided with the wind turbine, e.g. on at least one of a blade 22, a tower 15, a hub 20 and a nacelle 16. One or more of force sensors, e.g. load cells or strain gauges, proximity sensors and tilt sensors may be used. Other types of sensors may additionally or alternatively be used. For instance, one or more accelerometers may be used. Regarding visual inspection, one or more operators may for instance see that the vibration of the wind turbine 10 has increased. One or more air flow modifying elements 330 may then be retracted for reducing wind turbine vibration and/or avoiding or at least reducing harm to the wind turbine and/or the vibration mitigating device.

When a detected condition is no longer detected, e.g. vibration or a load exceeding a predetermined threshold, one or more air flow modifying elements 330 may be extended.

In some examples, a vibration mitigating device 350 may be mounted to a wind turbine blade 22 already installed on a wind turbine 10. In other examples, a vibration mitigating device 350 may be mounted to a wind turbine blade 22 to be lifted, alone or attached to a hub 20, up tower 15. In the examples where the blade 22 is not yet installed above a wind turbine tower 15, a vibration mitigating device 350 may be arranged on the wind turbine blade 22 on a wind turbine site. Arranging a vibration mitigating device 350, e.g. a device such as the one of the example of FIGS. 4A and 4B, around the blade 22 before carrying it to an installation site, may also be possible.

The device 350 may stay mounted to the blade 22 until operation of the wind turbine 10 is started or resumed. The method may further comprise removing the device 350 from the wind turbine blade 22 before starting or resuming operation. If more than one device 350 is installed, all of them may be removed before starting or resuming operation. One or more, including all, the air flow modifying elements 330 may be retracted for uninstalling the device 350 in some examples. Removal of the device 350 may be therefore more stable and easier.

In some examples, removing a device 350 may comprise detaching one or more ropes, e.g. from a blade 22, a nacelle 16 or a hub 20, and letting the device 350 fall by the action of gravity. The blade 22 may be pointing downwards, i.e. the blade may be at a substantially six o'clock position. If the blade 22 is not in this position, the rotor 18 may be rotated to put the blade 22 pointing downwards. If one or more drones are used to uninstall the devices, the drones may carry them to a ground 12, hub 20 or nacelle 16 in some examples. A device 350 may be used more than once in a same or a different wind turbine blade.

In a further aspect of the disclosure, a vibration mitigating device 350 for mitigating vibrations of a parked wind turbine 10 is provided. The device 350 is configured to be arranged at least partially around a wind turbine blade 22. The device 350 comprises an air flow modifying element 330, the air flow modifying element 330 being configured to be retracted and extended between two portions, e.g. two ends 310, 320, of the device 350.

A device according to this aspect may be a device such as the ones illustrated in FIGS. 4A-5B. In general, the previous explanations with respect to FIGS. 4A-5B may apply to the device of this aspect as well. Likewise, details of this aspect may be applicable to the previous aspects too.

The device 350 may be configured such that the air flow modifying element 330 is retractable and extendable between a root 310 and a tip 220 of a wind turbine blade 22 in some examples.

The device 350 may be configured to be mounted to a wind turbine blade 22 from a blade tip 220 towards a blade root 210. This may be directly and manually performed by several operators, or one or more ropes may be used to arrange the device 350 around and along the blade 22. One or more ropes attached to the device may in some examples be pulled from a hub 20 or a nacelle 16. In other examples, one or more drones may pull the device towards the blade root 210 and carry the ropes attached to the device 350 to a hub 20 or a nacelle 16.

In some examples, the device 350 may be configured to retract and extend the air flow modifying element 330. I.e., the device 350 may be configured to be automatically extended and retracted. For example, the device 350 may include some mechanism, system or component which allows it to extend and retract the air flow modifying element 330. In some examples, the device 350 may include a motor for moving the air flow modifying element 330 or for moving a support to which the air flow modifying element is attached. For example, if the device 350 includes one or more rails 410 and the air flow modifying element 330 is hanged from a plurality of hooks in the rails 410, the motor may move the rails or a component of the rails such that the air flow modifying element advances along the rails. In some other examples, the device 350 may be configured to be manually extended and/or retracted.

In some examples, the device 350 may comprise a frame 400 including one or more rails 410 and the air flow modifying element is extendable and retractable along the one or more rails. The one or more rails may extend between a tip support 302 and a root support 301 of the frame 400 in some examples.

This written description uses examples to disclose the teaching, including the preferred embodiments, and also to enable any person skilled in the art to practice the present disclosure, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A vibration mitigating device for mitigating vibrations of a parked wind turbine, the vibration mitigating device configured for engagement with a wind turbine blade, comprising:
    one or more air flow modifying elements that are configurable between a retracted configuration and an extended configuration;

a frame attachable to and having a fixed length in a span-wise direction of the wind turbine blade;

the air flow modifying elements movable along the frame between the retracted configuration and the extended configuration; and wherein in the retracted configuration the modifying elements extend between a blade tip and a blade root of the blade with a first spanwise length, and in the extended configuration the modifying elements extend between the tip end and the root end of the blade with a second, greater spanwise length.

2. The device according to claim 1, wherein the air flow modifying elements extend and retract along the frame towards one or both of the blade root and the blade tip of the wind turbine blade.

3. The device according to claim 1, wherein the air flow modifying elements are mounted on the frame spaced from a surface of the blade so as to provide a gap between the air flow modifying elements and the wind turbine blade when the device is mounted to the blade.

4. The device according to claim 1, comprising a power supply for extending or retracting the air flow modifying elements.

5. A wind turbine blade comprising the vibration mitigating device according to claim 1.

6. The device according to claim 1, wherein the frame comprises a tip support, a root support, and one or more rails extending between the tip support and the root support, the air flow modifying elements slidable along the rails between the tip support and the root support.

7. The device according to claim 6, wherein the tip support comprises a rigid member having an opening corresponding to a cross-sectional profile of a tip end portion of the blade and the root support comprises a rigid member having an opening corresponding to a cross-sectional profile of a root end portion of the blade.

8. The device according to claim 7, wherein the each of the tip and root supports comprise protrusions extending outwardly away from a surface of the blade, the one or more rails extends span-wise between the protrusions of the tip and root supports.

9. The device according to claim 8, wherein each of the tip and root supports comprises a C-shaped or U-shaped profile defined by the protrusions.

10. A method for mitigating vibrations of a parked wind turbine, the method comprising:

arranging a vibration mitigating device on a blade of the wind turbine, the vibration mitigating device having one or more air flow modifying elements in a first configuration;

changing the air flow modifying elements from the first configuration to a second configuration;

wherein the first configuration is one of a retracted configuration or an extended configuration, and the second configuration is the other of the extended configuration or the retracted configuration;

wherein the vibration mitigation device includes a frame attachable to and having a fixed length in a span-wise direction of the wind turbine blade;

the air flow modifying elements are moved along the frame between the retracted configuration and the extended configuration; and wherein in the retracted configuration the modifying elements extend between a blade tip and a blade root of the blade with a first spanwise length, and in the extended configuration the modifying elements extend between the tip end and the root end of the blade with a second, greater spanwise length.

11. The method according to claim 10, wherein changing the configuration of the air flow modifying elements comprises moving the air flow modifying elements between a first end and a second end of the frame.

12. The method according to claim 10, wherein changing the configuration of the air flow modifying elements comprises moving the air flow modifying elements along one or more rails of the frame.

13. The method according to claim 10, wherein in the first configuration, the air flow modifying elements are in a retracted configuration and in the second configuration, the air flow modifying elements are in an extended configuration, the method further comprising:

determining that a condition related to the vibration mitigating device or related to the wind turbine is met; and in response to the condition being met, changing the configuration of the air flow modifying elements to the second configuration.

14. The method according to claim 13, wherein the condition comprises an increase in vibrations of or loads on the vibration mitigating device or the wind turbine above a predetermined threshold determined by a sensor or visual inspection.

15. The method according to claim 10, wherein in the first configuration, the air flow modifying elements are in an extended configuration and in the second configuration, the air flow modifying elements are in a retracted configuration, the method further comprising:

determining that a condition related to the vibration mitigating device or related to the wind turbine is met; and in response to the condition being met, changing the configuration of the air flow modifying elements to the second configuration.

16. The method according to claim 15, wherein the condition comprises an increase in vibrations of or loads on the vibration mitigating device or the wind turbine above a predetermined threshold determined by a sensor or visual inspection.

* * * * *